(12) United States Patent
Kozat et al.

(10) Patent No.: US 10,645,009 B2
(45) Date of Patent: May 5, 2020

(54) METHOD AND APPARATUS FOR PROGRAMMABLE BUFFERS IN MOBILE NETWORKS

(71) Applicant: Futurewei Technologies, Inc., Plano, TX (US)

(72) Inventors: Ulas Can Kozat, Mountain View, CA (US); Prakash Ramchandran, Santa Clara, CA (US); Kaippallimalil Mathew John, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 87 days.

(21) Appl. No.: 15/462,560

(22) Filed: Mar. 17, 2017

(65) Prior Publication Data

US 2017/0272367 A1    Sep. 21, 2017

Related U.S. Application Data

(60) Provisional application No. 62/310,363, filed on Mar. 18, 2016.

(51) Int. Cl.
*H04L 12/851* (2013.01)
*H04L 12/863* (2013.01)

(52) U.S. Cl.
CPC ............. *H04L 47/24* (2013.01); *H04L 47/50* (2013.01)

(58) Field of Classification Search
None
See application file for complete search history.

(56) References Cited

U.S. PATENT DOCUMENTS

| | | | |
|---|---|---|---|
| 9,832,121 B1 * | 11/2017 | Singh | H04L 45/745 |
| 2002/0184381 A1 * | 12/2002 | Ryan | H04L 49/10 |
| | | | 709/234 |

(Continued)

FOREIGN PATENT DOCUMENTS

| | | |
|---|---|---|
| CN | 1937594 A | 3/2007 |
| CN | 104301248 A | 1/2015 |

(Continued)

OTHER PUBLICATIONS

"OpenFlow Switch Specification," Open Networking Foundation, Version 1.5.1 (Protocol version 0x06), Mar. 26, 2015, 283 pages.

(Continued)

*Primary Examiner* — Ajit Patel
(74) *Attorney, Agent, or Firm* — Slater Matsil, LLP

(57) ABSTRACT

It is possible to dynamically configure buffers in network devices by sending software defined network (SDN) instructions to a Control-to-Data-Plane Interface (CDPI) agents on the network devices. An SDN instruction may instruct a CDPI agent to configure a buffer in a network device to store a specific type of traffic flow in accordance with a traffic handling policy. In some embodiments, the SDN instruction instructs the CDPI Agent to directly configure a buffer by, for example, associating a virtual port with a new/existing buffer, binding a virtual port associated with the buffer to a switch, and/or installing a flow control rule in a flow table of the switch. In other embodiments, the SDN instruction may instruct the CDPI agent to reconfigure the buffer by transitioning the buffer to a different state.

36 Claims, 10 Drawing Sheets

(56) References Cited

U.S. PATENT DOCUMENTS

| | | | |
|---|---|---|---|
| 2004/0042397 A1* | 3/2004 | Chang | H04L 47/10 |
| | | | 370/230 |
| 2014/0219287 A1 | 8/2014 | Birke et al. | |
| 2014/0269288 A1* | 9/2014 | Crisan | H04L 47/2425 |
| | | | 370/231 |
| 2014/0369348 A1 | 12/2014 | Zhang et al. | |
| 2015/0026313 A1* | 1/2015 | Chawla | H04L 47/24 |
| | | | 709/220 |
| 2015/0172103 A1* | 6/2015 | DeCusatis | H04L 41/0681 |
| | | | 370/389 |
| 2015/0222550 A1* | 8/2015 | Anand | H04L 47/11 |
| | | | 370/235 |
| 2015/0280939 A1* | 10/2015 | Sindhu | H04L 12/4641 |
| | | | 370/236 |
| 2015/0281127 A1* | 10/2015 | Liu | H04L 49/25 |
| | | | 370/401 |
| 2015/0372902 A1* | 12/2015 | Giorgetti | H04L 45/64 |
| | | | 370/219 |
| 2016/0028620 A1* | 1/2016 | Hari | H04L 45/38 |
| | | | 370/389 |
| 2016/0191406 A1 | 6/2016 | Xiao et al. | |
| 2017/0063689 A1* | 3/2017 | Qin | H04L 45/38 |
| 2017/0142034 A1* | 5/2017 | K | H04L 1/188 |
| 2017/0195292 A1* | 7/2017 | Pham | H04L 63/0245 |
| 2018/0183708 A1* | 6/2018 | Farkas | H04L 45/38 |
| 2018/0227224 A1* | 8/2018 | Bhaskar | H04L 45/02 |
| 2018/0241844 A1* | 8/2018 | Munoz de la Torre Alonso | |
| | | | H04L 67/327 |

FOREIGN PATENT DOCUMENTS

| | | |
|---|---|---|
| CN | 104753704 A | 7/2015 |
| CN | 104852865 A | 8/2015 |
| EP | 2985963 A1 | 2/2016 |
| WO | 2015014133 A1 | 2/2015 |
| WO | 2015065003 A1 | 5/2015 |
| WO | 2015085950 A1 | 6/2015 |

OTHER PUBLICATIONS

"OpenFlow Table Type Patterns," Open Networking Foundation, Version 1.0, Aug. 15, 2014, 55 pages.

Bosshart, P., et al., "P4: Programming Protocol-Independent Packet Processors," ACM SIGCOMM Computer Communication Review, vol. 44, No. 3, Jul. 2014, pp. 88-95.

Enns, R., et al. "Network Configuration Protocol (NETCONF)," Internet Engineering Task Force (IETF), Request for Comments: 6241, Jun. 2011, 113 pages.

Foukas, X., et al., "FlexRAN: A Flexible and Programmable Platform for Software-Defined Radio Access Networks," Proceedings of the 12th International Conference on emerging Networking EXperiments and Technologies, Dec. 12-15, 2016, pp. 427-441.

Han, S., et al., "SoftNIC: A Software NIC to Augment Hardware." Univ. of California, Berkeley, Dept. EECS, Berkeley, CA, USA, Technical Report No. UCB/EECS-2015-155, May 27, 2015, 17 pages.

Kohler, E., et al., "The Click Modular Router," ACM Transactions on Computer Systems (TOCS), vol. 18, Issue 3, Aug. 2000, 34 pages.

The Linux Foundation Projects, "Vector Packet Processing (VPP)," Retrieved from https://fd.io/technology/#vpp on Jul. 19, 2017, 7 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)," 3GPP TS 36.300 V12.3.0, Sep. 2014, 215 pages.

* cited by examiner

METHOD AND APPARATUS FOR PROGRAMMABLE BUFFERS IN MOBILE NETWORKS

CROSS REFERENCE TO RELATED APPLICATIONS

This patent application claim priority to U.S. Provisional Application No. 62/310,363, filed on Mar. 18, 2016 and entitled "Buffer Switch for Processing Traffic Packets," which is hereby incorporated by reference herein as if reproduced in its entirety.

TECHNICAL FIELD

Embodiments of the present disclosure relate generally to mobile communications, and, in particular embodiments, to programmable buffers in mobile networks.

BACKGROUND

As a traffic flow is forwarded over a data-plane of network, individual packets in the traffic flow are generally stored in packet buffers by network devices. A packet buffer is a memory space in a network device that is reserved for storing packets awaiting transmission or processing. A network device that receives, or otherwise generates, a packet will generally store the packet in a packet buffer of the network device until the network device is ready to transmit, or otherwise process, the packet. The manner in which the packet is buffered significantly affects the quality of service (QoS) experienced by the end-user.

SUMMARY

Technical advantages are generally achieved, by embodiments of this disclosure which describe systems and methods for programmable buffers in mobile networks.

In accordance with an embodiment, a method for dynamically configuring buffers is provided. In this example, the method includes sending a software defined network (SDN) instruction to a network device on a data plane of a telecommunications network. The SDN instruction instructs a Control-to-Data-Plane Interface (CDPI) Agent to configure a buffer in the network device to store a specific type of traffic flow in accordance with a traffic handling policy. The network device may be a network gateway, a network switch, a network router, a base station, or a relay station. The controller may be a mobility management entity (MME), a Slice Management Entity, a Connectionless Service Management Entity, a content distribution network (CDN) management entity, a cache Management entity, or a radio resource control (RRC) signaling controller. An apparatus and computer program product for implementing the method on behalf of the controller are also provided.

In accordance with another embodiment, yet another method for dynamically configuring buffers is provided. In this example, the method includes receiving a software defined network (SDN) instruction from a controller at a Control-to-Data-Plane Interface (CDPI) Agent in a network device, and configuring a buffer based in the network device based on the SDN instruction. An apparatus and computer program product for implementing the method on behalf of the CPDI Agent are also provided.

In both embodiments, the SDN instruction instructs the CDPI Agent to configure the buffer based in the network device. In one example, the SDN instruction instructs the CPDI Agent to establish a new buffer in the network device, and to store a specific type of traffic flow in accordance with the traffic handling policy. In another example, the SDN instruction instructs the CDPI Agent to reconfigure an existing buffer to store the specific type of traffic flow in accordance with the traffic handling policy. In yet another example, the SDN instruction instructs the CDPI Agent to associate a virtual port with the existing buffer. In yet another example, the SDN instruction instructs the CDPI Agent to bind a virtual port associated with the buffer to a switch. In yet another example, the SDN instruction instructs the CDPI Agent to install a flow control rule in a flow table of a switch bound to a virtual port associated with the buffer. In such an example, the switch is configured to switch packets between the virtual port associated with the buffer and a physical port of the network device according to the flow control rule in the flow table.

In yet another example, the SDN instruction instructs the CDPI Agent to transition a state of the buffer to a null state. In such an example, transitioning the state of the buffer to the null state detaches virtual ports that were previously bound to the buffer and reclaims memory that was previously allocated to the buffer. In yet another example, the SDN instruction instructs the CDPI Agent to transition a state of the buffer to an initialized state. Transitioning the state of the buffer to the initialized state allocates memory to the buffer and configures the buffer to store packets in accordance with one or more specific packet handling policies. In yet another example, the SDN instruction instructs the CDPI Agent to transition a state of the buffer to an initialized state. Transitioning the state of the buffer to the initialized state allocates memory to the buffer and configures the buffer to store packets in accordance with one or more specific packet handling policies.

In yet another example, the SDN instruction instructs the CDPI Agent to transition a state of the buffer to a storing state. Transitioning the state of the buffer to the storing state prevents the buffer from both storing new packets and sending existing packets over virtual ports bound to the buffer. In yet another example, the SDN instruction instructs the CDPI Agent to transition a state of the buffer to a simple buffering state. Transitioning the state of the buffer to the simple buffering state prevents the buffer sending existing packets over any virtual ports while permitting the buffer to store new packets. In yet another example, the SDN instruction instructs the CDPI Agent to transition a state of the buffer into a serving state. Transitioning the state of the buffer to the serving state prevents the buffer from storing new packets while permitting the buffer to send existing packets over one or more virtual ports bound to the buffer according to one or more specific packet handling policies.

In yet another example, the SDN instruction instructs the CDPI Agent to transition a state of the buffer into an overlay queue state. Transitioning the state of the buffer to the overlay queue state permits the buffer to both store new packets and send existing packets over one or more virtual ports associated with the buffer according to one or more specific packet handling policies. The method may also include sending a subsequent SDN instruction that instructs the CDPI Agent associated to terminate an existing buffer in the network node.

BRIEF DESCRIPTION OF THE DRAWINGS

Various ones of the appended drawings merely illustrate example embodiments of the present disclosure and cannot be considered as limiting its scope.

Figure 1:
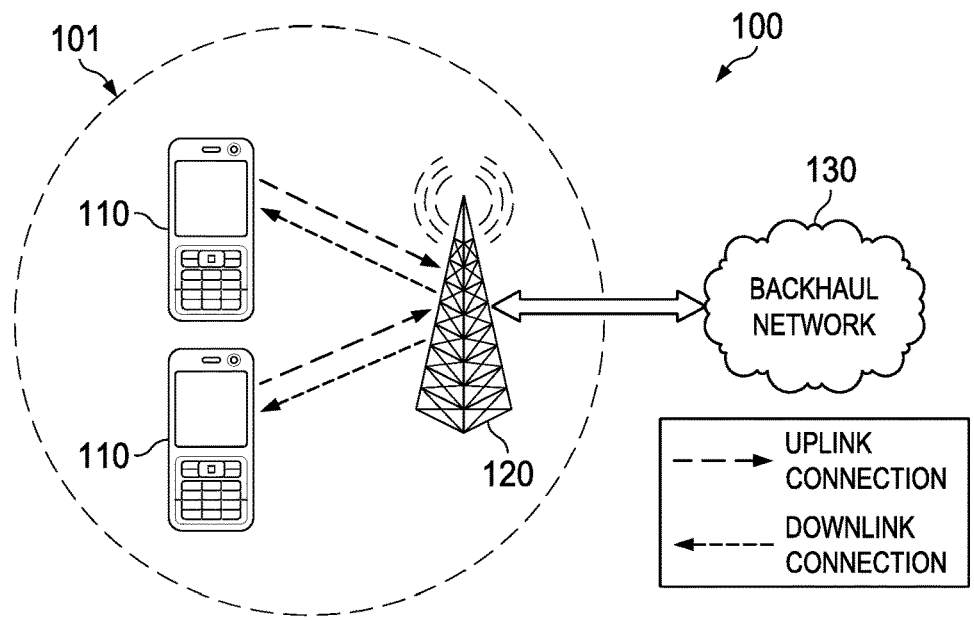
FIG. 1 illustrates a diagram of an embodiment wireless communications network.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As a traffic flow is forwarded over a data-plane of network, individual packets in the traffic flow are generally stored in buffers by network devices. The buffers are generally statically configured to store different types of traffic flows according to different traffic handling policies. Accordingly, network devices must generally be replaced, or otherwise serviced on-site (e.g., re-programmed/flashed), in order to update the traffic handling policies that govern how a given type of traffic is buffered/stored.

Embodiments of this disclosure provide techniques for dynamically configuring buffers by sending software defined network (SDN) instructions to a Control-to-Data-Plane Interface (CDPI) agent on a network device. The SDN instruction may instruct the CDPI agent to configure a buffer in the network device to store a specific type of traffic flow in accordance with a traffic handling policy. In one embodiment, the SDN instruction instructs the CDPI agent to establish a new buffer in the network device. In such an embodiment, the SDN instruction may also instruct the CDPI agent to configure the new buffer to store a specific type of traffic flow in accordance with a traffic handling policy. In another embodiment, the SDN instruction instructs the CPDI Agent associated to reconfigure an existing buffer to store the specific type of traffic flow in accordance with the traffic handling policy. In some embodiments, the SDN instruction instructs the CDPI Agent to directly configure the new/existing buffer. For example, the SDN instruction may instruct the CDPI agent to associate a virtual port with the new/existing buffer, bind a virtual port associated with the buffer to a switch, and/or install a flow control rule in a flow table of the switch. In such examples, the switch may be configured to switch packets between the virtual port associated with the buffer and a physical port of the network device according to the flow control rule in the flow table. In other embodiments, the SDN instruction may instruct the CDPI agent to reconfigure the buffer by transitioning the buffer to a different state. For example, the SDN instruction may instruct the CDPI agent to transition the buffer into a null state in order to detach virtual ports that were previously bound to the buffer and reclaim memory that was previously allocated to the buffer. As another example, the SDN instruction may instruct the CDPI Agent to transition the buffer into an initialized state, which may cause the CDPI agent to allocate memory to the buffer, and configure the buffer to store packets in accordance with one or more specific packet handling policies. As yet another example, the SDN instruction may instruct the CDPI Agent to transition the buffer into a storing state, which may prevent the buffer from storing new packets, as well as prevent the buffer from sending existing packets over virtual ports bound to the buffer. As yet another example, the SDN instruction may instruct the CDPI Agent to transition the buffer into a simple buffering state, which may prevent the buffer sending existing packets over virtual ports bound to the buffer while still permitting the buffer to store new packets. As yet another example, the SDN instruction may instruct the CDPI Agent to transition the buffer into a serving state in order to prevent the buffer from storing new packets while still permitting the buffer to send existing packets over one or more virtual ports bound to the buffer on a first-in-first-out (FIFO) basis. As yet another example, the SDN instruction may instruct the CDPI Agent to transition the buffer into an overlay queue state, which may permit the buffer to both store new packets and send existing packets over one or more virtual ports bound to the buffer on a first-in-first-out (FIFO) basis. Notably, SDN instructions may also instruct a CPDI Agent associated to terminate an existing buffer in a network node. These and other inventive aspects are described in greater detail below.

FIG. 1 is a diagram of a network 100 for communicating data. The network 100 comprises a base station 110 having a coverage area 101, a plurality of mobile devices 115, and a backhaul network 130. As shown, the base station 110 establishes uplink (dashed line) and/or downlink (dotted line) connections with the mobile devices 115, which serve to carry data from the mobile devices 115 to the base station 110 and vice-versa. Data carried over the uplink/downlink connections may include data communicated between the mobile devices 115, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., next generation radio (5G), long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
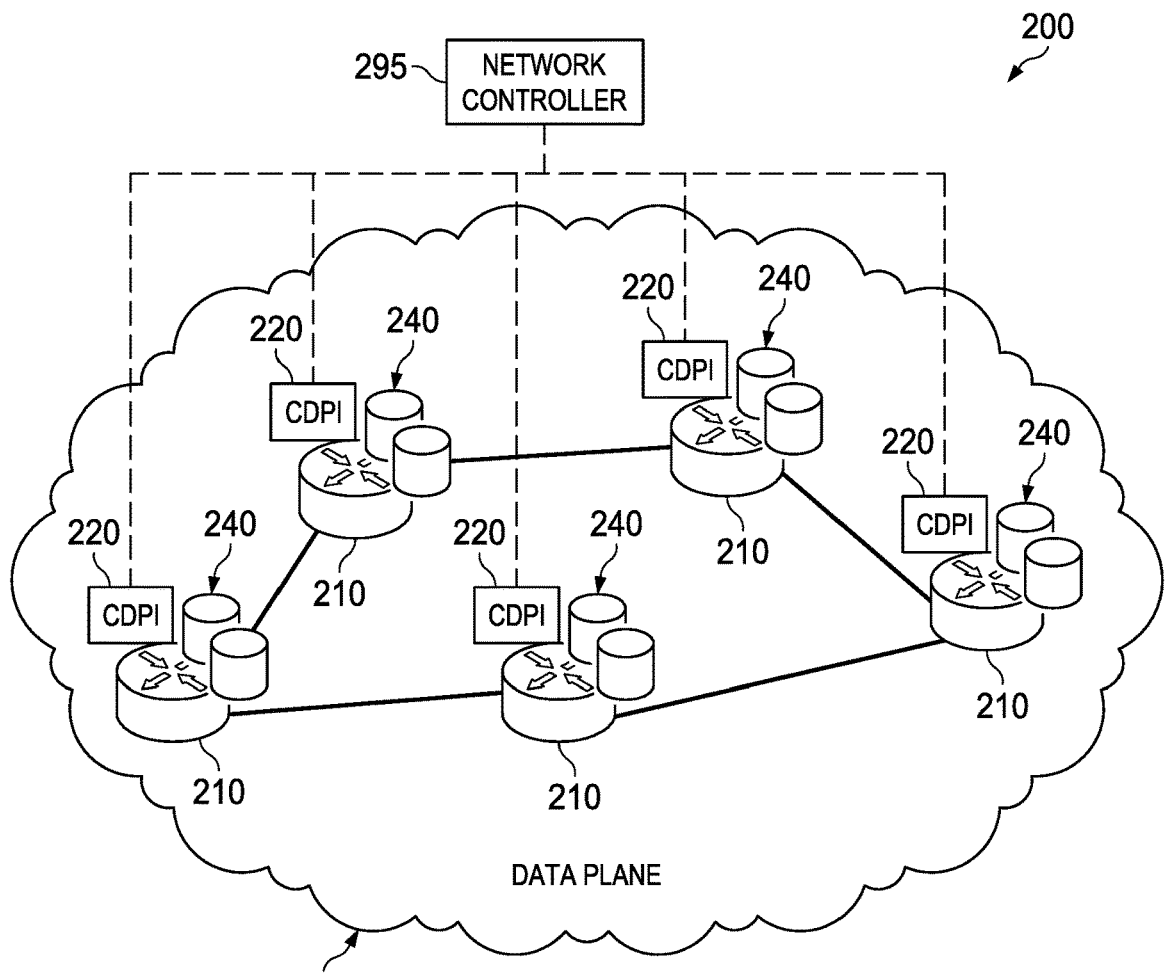
FIG. 2 is a diagram of a network configured to support the dynamic configuration of programmable buffers in network devices on a data plane.

Embodiments of this use SDN instructions to dynamically configure buffers in network devices along a data plane. FIG. 2 is a diagram of a network 200 in which a network controller 295 dynamically configures buffers 240 in network devices 210 of a data plane 201. In particular, the network controller 295 may send SDN instructions to CDPIs on the network devices 210. The SDN instructions may instruct the CDPIs 220 to configure, or terminate, buffers 240 in the network devices 210. The network controller 295 may include any device, function, application, or collection of devices, functions, applications, configured to remotely manage programmable buffers in network devices, including (but not limited to) a mobility management entity (MME), a Slice Management Entity, a Connectionless Service Management Entity, a content distribution network (CDN) management entity, a cache Management entity, and/or a radio resource control (RRC) signaling controller. In some embodiments, a "network controller" is a "network control function" instantiated in a management layer of a telecommunications network. The network devices 210 may include any device, or collection of devices, configured to receive, buffer, and forward traffic flows over the data plane 201 in accordance with a traffic handling policy, including (but not limited to) a network switch, a network gateway (e.g., a serving gateway (SGW), a PDN gateway (PGW), etc.), a network router, a base station, and/or a relay station. The network devices 210 can include physical boxes with both hardware and software components as well as can be virtual appliances solely implemented in software but visible to network controllers as if they are distinct physical boxes. The buffers 240 may include any region of physical memory storage in the corresponding network devices 210 that is used to temporarily store data. In one example, the SDN instruction is a device-specific instruction corresponding to a particular network device type associated with the network device. For example, the SDN instruction may be a gateway-specific SDN instruction, a switch-specific SDN instruction, a router-specific SDN instruction, a relay-specific SDN instruction, or a base-station-specific SDN instruction.

Figure 3:
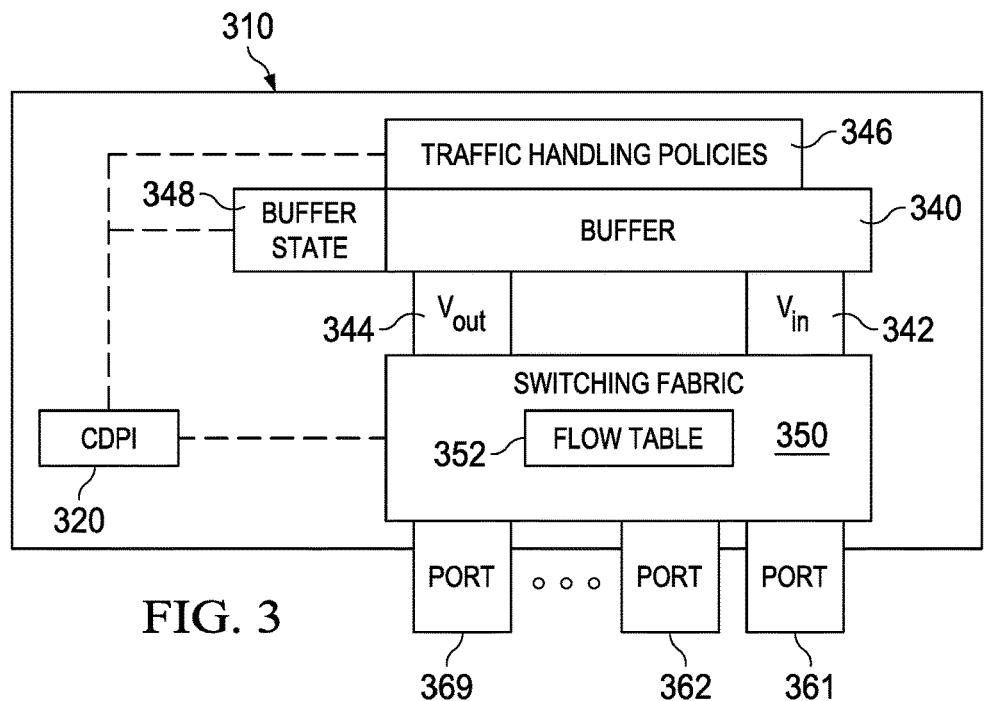
FIG. 3 is a diagram of an embodiment network device configured to support the dynamic configuration of programmable buffers.

FIG. 3 is a diagram of an embodiment network device 310 that is capable of supporting dynamic buffer configuration. As shown, the network device 310 includes a CDPI agent 320, one or more programmable buffers 340, a switching fabric 350, and ports 361-369. The CDPI agent 320 provides an interface between a network controller and the network device 310 to create the programmable buffers 340, and may be utilized to dynamically configure the programmable buffers 340 in various ways. Each programmable buffer 340 may be independently created and configured from each other. For example, the CDPI agent 320 may establish/instantiate the programmable buffer 340 as a new buffer in the network device 310. The CDPI agent 320 may configure the programmable buffer 340 to store traffic flows in accordance with traffic handling policies 345. These traffic handling policies may include any policy that defines how packets are handled by programmable buffer 340, including (but not limited to) packet admission control policies indicating which packets to accept or drop when the programmable buffer 340 is full (or otherwise has a capacity that exceeds a threshold) and packet service order policies indicating how packets are ordered/prioritized by the programmable buffer 340 (e.g., First Come First Serve, Last Come First Serve, etc.). The CDPI agent 320 may associate one or more virtual ports 342, 344 with the programmable buffer, and configure the switching fabric to bind the virtual ports 342, 344 with one or more of the physical ports 361, 362, 369 of the network device 310. Association/attachment of virtual ports 342, 344 may serve to activate the traffic handling policies 345 of the programmable buffer 340. Additionally, the CPDI agent 320 may install one or more flow control rules in a flow table 352 of the switching fabric 350. The switching fabric 350, which is also referred to as a "switch" (for short), may switch packets between the virtual ports 342, 344 associated with the buffer 340 and the physical ports 361, 362, 369 of the network device 310 according to flow control rules in the flow table 352. The flow table 352 can be a single table. Alternatively, the flow table 352 can be implemented as a cascade of tables, where each table contains flow control rules for a particular type of packet, e.g., packets having a certain type/class of header or carrying a particular type/class of payload. Some of the flow control rules installed in the switching fabric 350 may be associated with virtual ports configured in Receive (RX) mode (e.g., the virtual port 342), and may direct specific packets to said virtual ports, which may in turn pass the packets to a corresponding programmable buffer (e.g., the programmable buffer 340) associated with said virtual port. Virtual ports configured in an RX mode are referred to herein as "RX virtual ports." The programmable buffer 340 buffers the packets according to corresponding traffic handling policies 346, and (when appropriate) passes the buffered packets to a corresponding virtual port configured in Transmit (TX) mode (e.g., the virtual port 344), which passes the packets to the switching fabric 350. Virtual ports configured in a TX mode are referred to herein as "TX virtual ports." The switching fabric 350 then switches the packets to a corresponding physical port of the network device, or to a virtual port associated with another virtual buffer, based on flow control rules installed a flow table of the switching fabric 350.

The CDPI agent 320 may also configure the programmable buffer 340 by transitioning a buffering state 348 of the programmable buffer 340 into a null state, an initialized state, a simple buffering state, a storing state, a serving state, or an overlay queue state based on the instructions and policies received from network controllers 295. The operational states of distinct programmable buffers can be either completely decoupled from one another or coupled to one another depending on the SDN instructions and policies received from corresponding network controllers.

Figure 4:
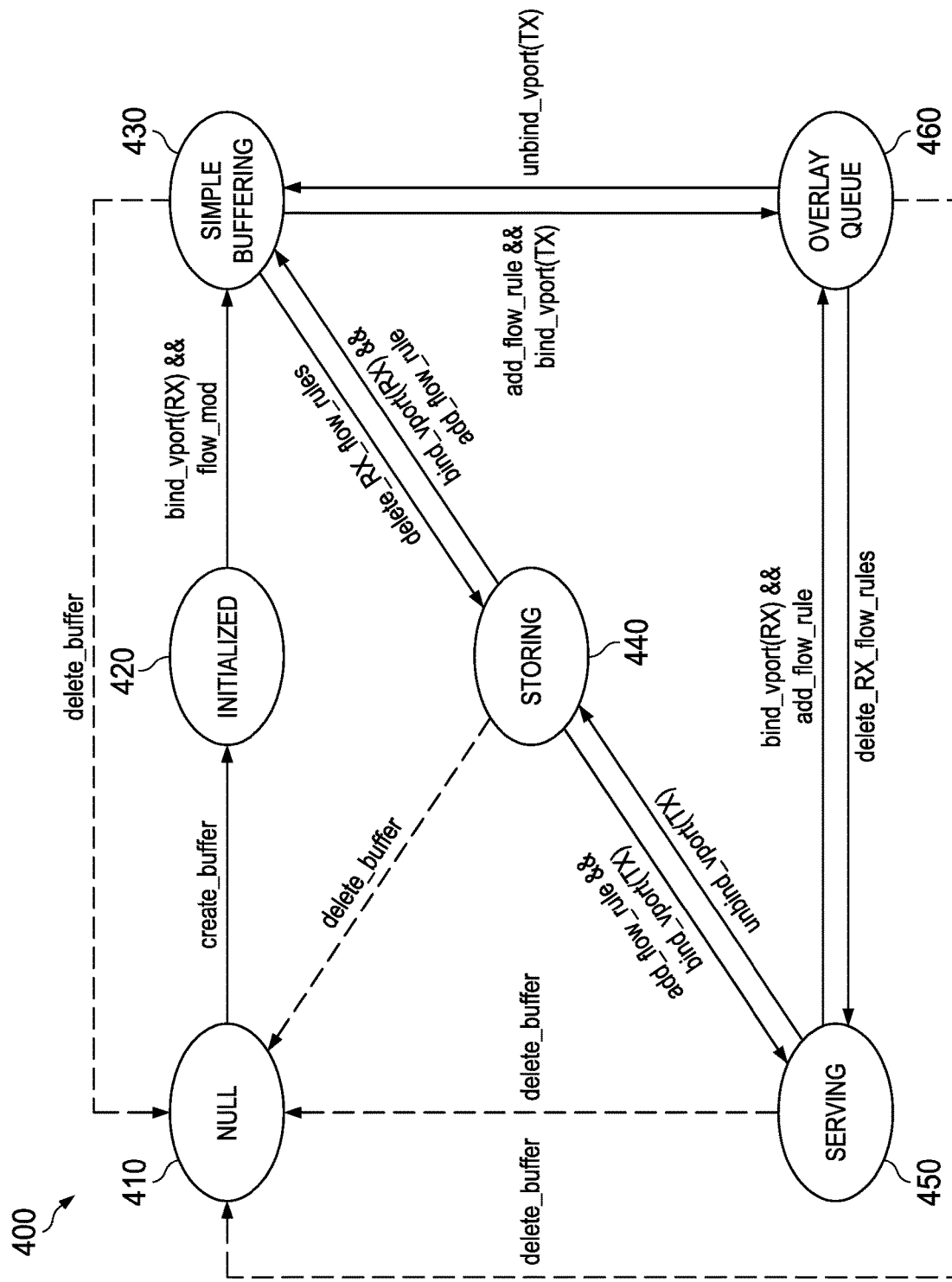
FIG. 4 is a diagram of a state machine associated with a programmable buffer.

FIG. 4 is a diagram of a state machine 400 associated with the programmable buffer 340. Initially, the CDPI agent 320 may be instructed to establish/create the programmable buffer 340 in the network component 310 by transitioning the buffer from a null state 410 to an initialized state 420. Prior to, or in the process of, transitioning the programmable buffer 340 into the initialized state 420, the CDPI agent 320 may allocate memory to the programmable buffer 340, as well as configure the programmable buffer 340 to store packets in accordance with a traffic handling policy. After transitioning the programmable buffer 340 into the initialized state 420, the CDPI agent 320 may return a locally unique identifier associated with the programmable buffer 340 to the network controller. Thereafter, the locally unique identifier may be used by the network controller to instruct the CDPI agent 320 to configure the programmable buffer 340.

The CDPI agent 320 may be instructed to transition the programmable buffer 340 from the initialized state 420 into a simple buffering state 430. Prior to, or in the process of, transitioning the programmable buffer 340 into the simple buffering state 430, the CDPI agent 320 may associate one or more RX virtual ports (e.g., the virtual port 342) with the programmable buffer 340, and install flow control rules in a switching fabric bound to said RX virtual ports. While operating in the simple buffering state 430, the programmable buffer 340 may store new packets received over RX mode virtual ports (e.g., the virtual port 342), but may not send buffered packets over any TX virtual ports (e.g., the virtual port 344).

The CDPI agent 320 may be instructed to transition the programmable buffer 340 from the simple buffering state 430 into a storing state 440. Prior to, or in the process of, transitioning the programmable buffer 340 from the simple buffering state 430 into the storing state 440, the CDPI agent 320 may delete flow rules associated with RX virtual ports attached to the programmable buffer 340 from the switching fabric 350 and/or detach RX virtual ports from the programmable buffer 340. While operating in the storing state 430, the programmable buffer 340 may continue to store existing packets, but may be unable to receive new packets over RX virtual ports or send existing packets over TX virtual ports. The storing state 430 may be used for caching packets of specific network flows in the programmable buffer 430 until further instructions from the network controller are received or specific conditions set forth by the network controller are satisfied.

The CDPI agent 320 may be instructed to transition the programmable buffer 340 from the storing state 440 into the simple buffering state 430. Prior to, or in the process of, transitioning the programmable buffer 340 from the storing state 440 into the simple buffering state 430, the CDPI agent 320 may attach new RX virtual ports to the programmable buffer 340 and/or install flow control rules in the switching fabric 350 for RX virtual ports attached to the programmable buffer 340.

The CDPI agent 320 may be instructed to transition the programmable buffer 340 from the simple buffering state 430 into an overlay queue state 460. Prior to, or in the process of, transitioning the programmable buffer 340 from the simple buffering state 430 into the overlay queue state 460, the CDPI agent 320 may attach one or more TX virtual ports to the programmable buffer 340 and/or install flow control rules in the switching fabric 350 for TX virtual ports attached to the programmable buffer 340. While operating in the overlay queue state 460, the programmable buffer 340 may be able to both store new packets received over RX virtual ports (e.g., the virtual port 342) attached to the programmable buffer and send buffered packets over TX virtual ports (e.g., the virtual port 344) attached the programmable buffer 340. The programmable buffer 340 may send, receive, and buffer said packets according to the traffic handling policies 346 while operating in the overlay queue state 460.

The CDPI agent 320 may be instructed to transition the programmable buffer 340 from the overlay queue state 460 back to the simple buffering state 430. Prior to, or in the process of, transitioning the programmable buffer 340 from the overlay queue state 460 to the simple buffering state 430, the CDPI agent 320 may delete flow rules associated with TX virtual ports attached to the programmable buffer 340 from the switching fabric 350 and/or detach TX virtual ports from the programmable buffer 340.

The CDPI agent 320 may be instructed to transition the programmable buffer 340 from the storing state 340 into a serving state 450. Prior to, or in the process of, transitioning the programmable buffer 340 from the storing state 340 into the serving state 450, the CDPI agent 320 may attach TX virtual ports (e.g., the virtual port 344) to the programmable buffer 340 and/or install flow control rules in the switching fabric 350 for TX virtual ports attached to the programmable buffer 340. While operating in the serving state 450, the programmable buffer 340 may be able to send buffered packets over TX virtual ports, but may be unable to receive new packets over RX virtual ports.

The CDPI agent 320 may be instructed to transition the programmable buffer 340 from the serving state 450 back to the storing state 440. Prior to, or in the process of, transitioning the programmable buffer 340 from the serving state 450 to the storing state 440, the CDPI agent 320 may delete flow rules associated with TX virtual ports attached to the programmable buffer 340 from the switching fabric 350 and/or detach TX virtual ports from the programmable buffer 340.

The CDPI agent 320 may be instructed to transition the programmable buffer 340 from the overlay queue state 460 to the serving state 450. Prior to, or in the process of, transitioning the programmable buffer 340 from the overlay queue state 460 to the serving state 450, the CDPI agent 320 may delete flow rules for RX virtual ports from the switching fabric 350 and/or detach RX virtual ports from the programmable buffer 340.

The CDPI agent 320 may be instructed to transition the programmable buffer 340 from the serving state 450 to the overlay queue state 460. Prior to, or in the process of, transitioning the programmable buffer 340 from the serving state 450 to the overlay queue state 460, the CDPI agent 320 may attach RX virtual ports to the programmable buffer 340 and/or install flow control rules in the switching fabric 350 for RX virtual ports attached to the programmable buffer 340.

At any time, the CDPI agent 320 may be instructed to transition the programmable buffer 340 into the null state 410. Prior to, or in the process of, transitioning the programmable buffer 340 into the null state 410, the CDPI agent 320 may detach all RX and TX virtual ports from the programmable buffer 340 and reclaiming memory that was previously allocated to the programmable buffer 340. The CDPI agent 320 may also delete all flow rules for RX/TX virtual ports attached, or previously attached, to the programmable buffer 340 from the switching fabric 350.

Figure 5:
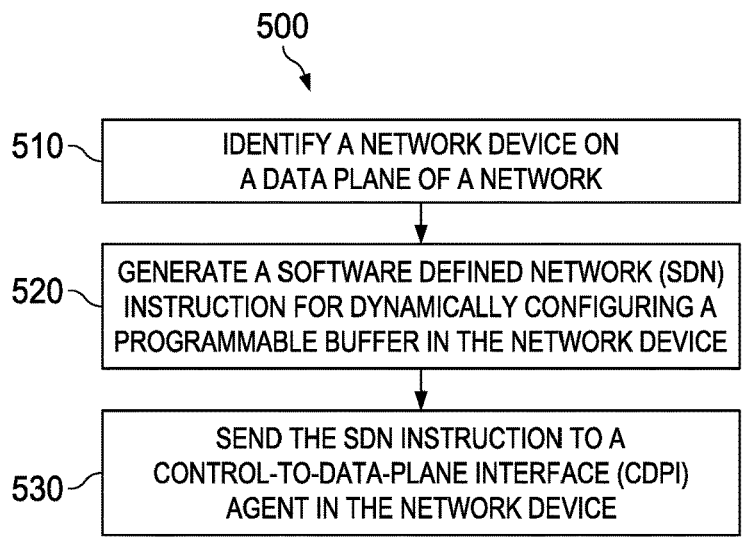
FIG. 5 is a flowchart of an embodiment method for dynamically configuring a programmable buffer.

FIG. 5 is a flowchart of an embodiment method 500 for dynamically configuring a buffer in a network device, as may be performed by a network controller. At step 510, the network controller identifies a network device on a data plane of a network. At step 520, the network controller generates an SDN instruction for dynamically configuring a programmable buffer in the network device. At step 530, the network controller sends the SDN instruction to a CDPI agent in the network device. The SDN instruction instructs the CDPI agent to configure the programmable buffer to store a specific type of traffic flow in accordance with a traffic handling policy.

The specific type of traffic flow may be any type of traffic flow The specific type of traffic flow may be any type of traffic flow, including (but not limited to): (i) IP flows with destination or source IP matching to a particular user equipment (UE); (ii) IP flows with destination or source IP matching to a particular service; (iii) transmission control protocol (TCP)/IP, user data gram protocol (UDP)/IP, and/or stream control transmission protocol (SCTP)/IP flows that match carry one or more fields specified by a specific four-tuple identifier, e.g., <source IP address, destination IP address, source transport port, destination transport port>, (note that the flows may carry one or more of the fields specified by the specific four-tuple identifier, while the other fields specified by the specific four-tuple identifiers can be left as wild-carded, e.g., not present, or otherwise identifiable, in the packet); (iv) Multiprotocol Label Switching (MPLS) flows with a specified label; (v) Layer 2 flows with a specified virtual local area network (VLAN) tag or virtual extensible local area network (VXLAN) identifier; (vi) network service header (NSH) flows with a particular service chain identifier; (vii) Video flows having a specific packet headers or tagged by the network after packet inspection; (viii) Internet of Things (IoT) flows identified by a IoT flow specific header field. Other examples are also possible; (ix) voice over IP (VoIP) flows identified by their packet headers or tagged by the network after packet inspection; and/or (x) flows that are coming from a particular switch port and/or with a particular tunnel or path identifier. Other examples are also possible.

Figure 6:
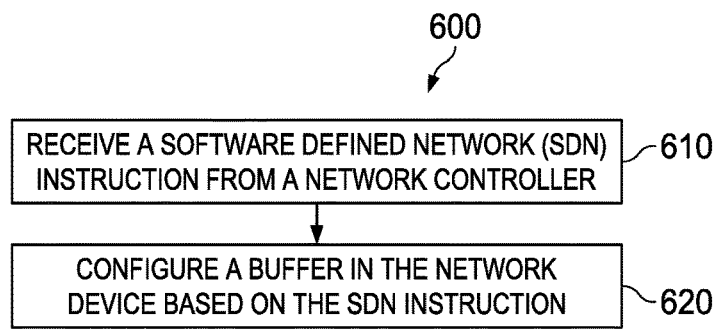
FIG. 6 is a flowchart of another embodiment method for dynamically configuring a programmable buffer.

FIG. 6 is a flowchart of an embodiment method 600 for dynamically configuring a buffer in a network device, as may be performed by a CDPI agent in the network device. At step 610, the CDPI agent receives an SDN instruction from a network controller. At step 620, the CDPI agent configures a buffer in the network device based on the SDN instruction.

Figure 7:
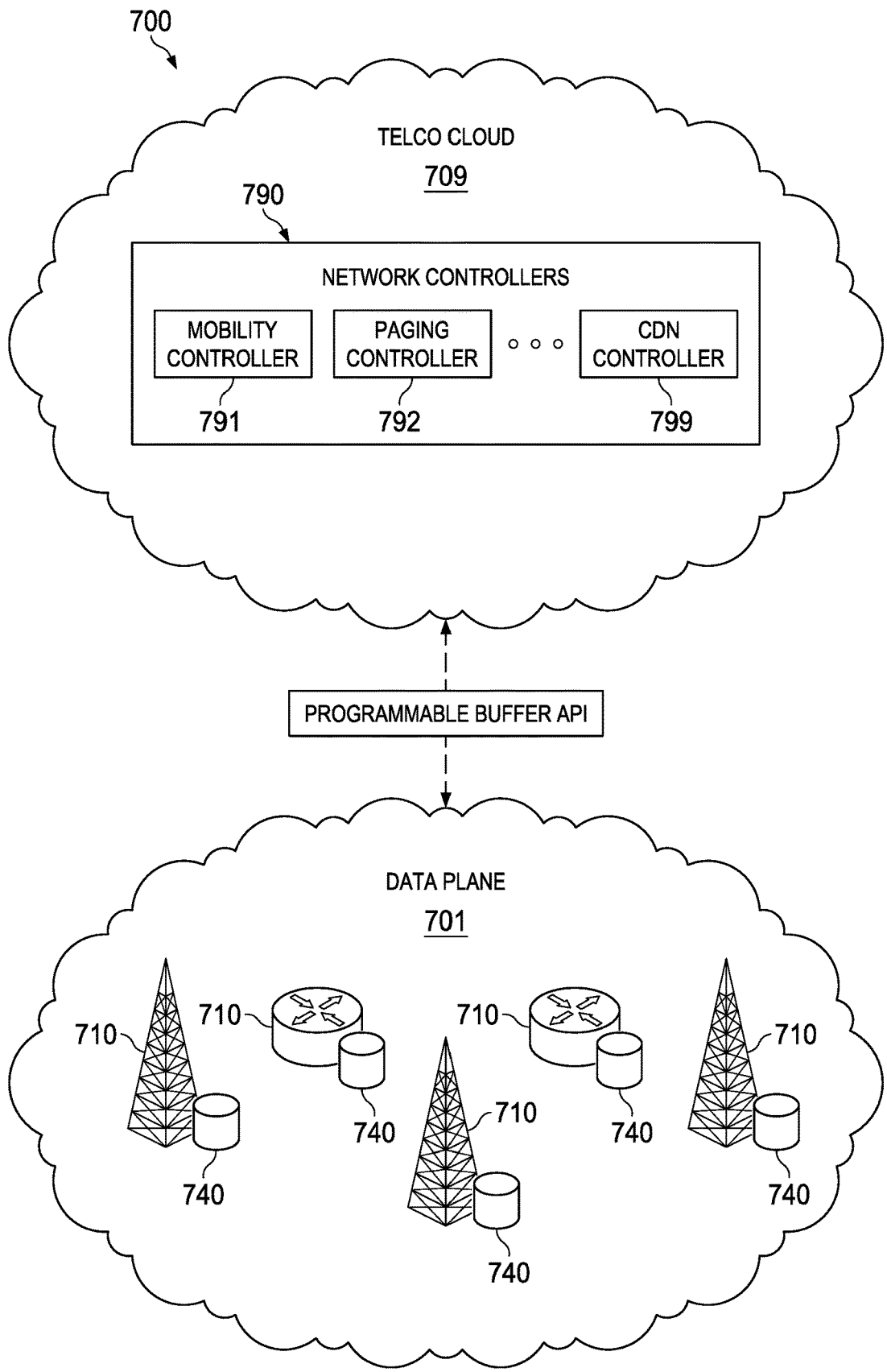
FIG. 7 is a diagram of an embodiment network configured to support the dynamic configuration of programmable buffers in network devices on a data plane.

FIG. 7 is a diagram of an embodiment network 700 in which a set of network controllers 790 in a telco cloud 709 dynamically configure programmable buffers 740 in network components 710 on a data plane 701 of the network 700. The set of network controllers 790 may include various different types of controllers. In this example, the set of network controllers 790 include a mobility controller 791, a paging controller 792, and a content distribution network (CDN) controller 799. The mobility controller 791 may be any component, or collection of components, configured to perform mobility management control functions in the network 700. In one embodiment, the mobility controller 791 includes a mobility management entity (MME). The paging controller 792 may be any component, or collection of components, configured to perform paging control functions in the network 700. The CDN controller 799 may be any component, or collection of components, configured to manage the distributed caching of content in the network 700.

Figure 8:
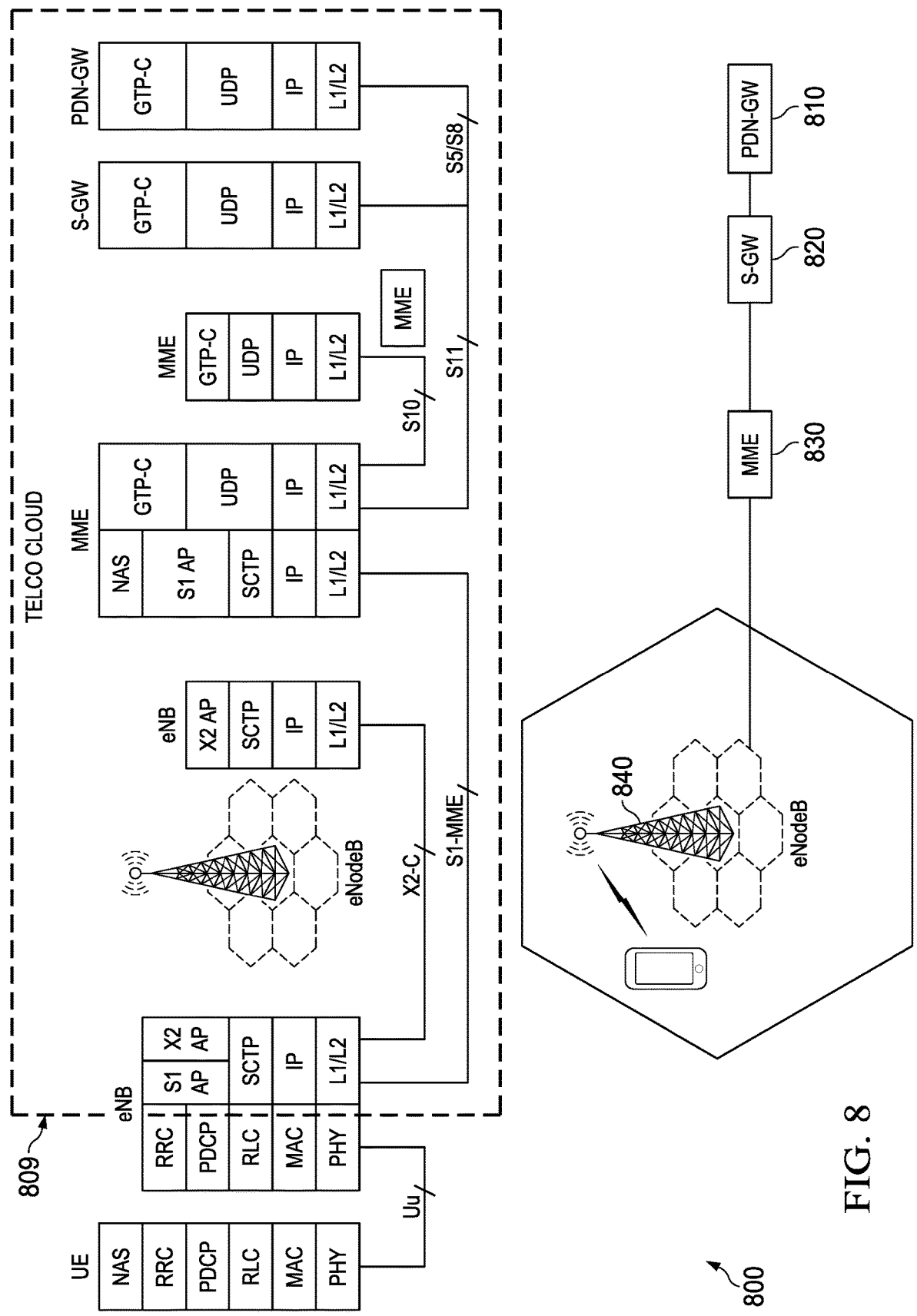
FIG. 8 is a diagram showing control/management functions that may be included in a Telco cloud in next generation wireless networks.

FIG. 8 is a diagram showing control/management functions in a legacy LTE network 800 that may be migrated to a Telco cloud in next generation wireless networks. As shown, various control/management functions of a PDN gateway (PGW) 810, a serving gateway (SGW) 820, an MME 830, and an eNB 840 may be dynamically managed by controllers in the Telco cloud 809. Such management and control functions may include layer-one/layer-two (L1/L2) control functions, IP-layer control functions, user data gram protocol (UDP) layer control functions, general packet radio service (GPRS) tunneling packet (GTP) layer control functions, stream control transmission protocol (SCTP) control functions, S1 access protocol (S1AP) control functions, X2 AP control functions, and/or non-access stratum (NAS) control functions.

Figure 9:
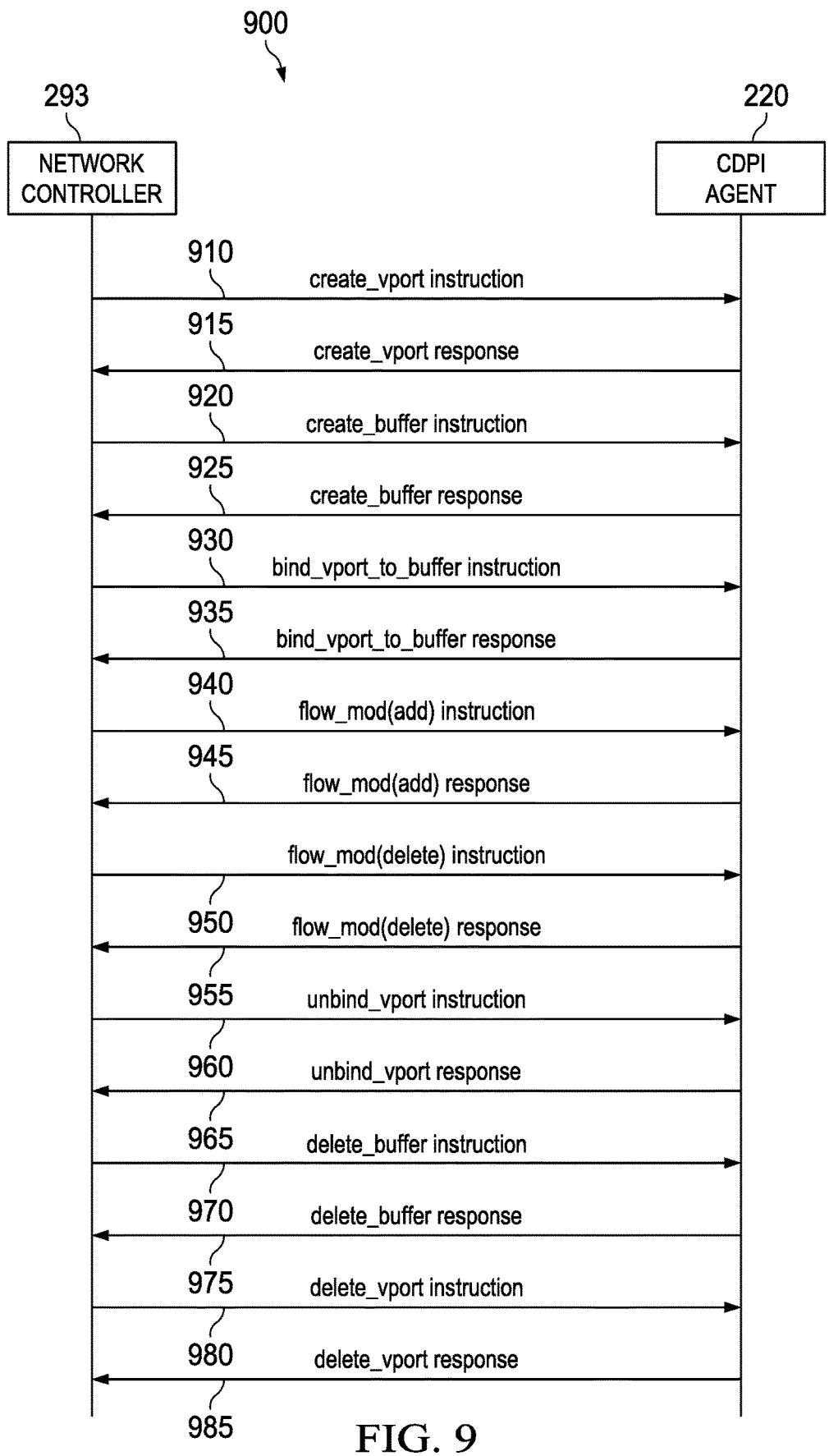
FIG. 9 is a protocol diagram of an embodiment communications sequence for configuring a programmable buffer.

FIG. 9 is a protocol diagram of an embodiment communications sequence 900 for configuring a programmable buffer, as may occur between the network controller 295 and a CDPI agent 220. In this example, the embodiment communications sequence 900 begins when the network controller sends a create virtual port (create_vport) instruction 910 to the CDPI agent 220. The create_vport instruction 910 instructs the CDPI agent 220 to create one or more virtual ports. In response to receiving the create_vport instruction 910, the CDPI agent 220 creates the virtual port(s), and returns a create_vport response 910 to the network controller 295 indicating a virtual port identifier(s) assigned to the virtual port(s).

The network controller 295 may also send a create buffer (create_buffer) instruction 920 to the CDPI agent 220. The create_buffer instruction 920 instructs the CDPI agent 220 to create a programmable buffer. Upon receiving the create_buffer instruction 920, the CDPI agent 220 creates the programmable buffer by, for example, allocating memory to the programmable buffer, and returns a create_buffer response 925 to the network controller 295 indicating a locally unique identifier for the programmable buffer.

The network controller 295 may also send a binding virtual port to buffer (bind_vport_to_buffer) instruction 930 to the CDPI agent 220 that instructs the CDPI agent 220 to bind one or more virtual ports to a programmable buffer. In turn, the CDPI agent 220 binds the virtual port(s) to the programmable buffer, and returns a bind_vport_to_buffer response 935 to the network controller 295 that the virtual port(s) have been bound to the programmable buffer. The bind_vport_to_buffer instruction 930 can attach a floating virtual port (e.g., a virtual port not bound to any buffer) or a bound virtual port (e.g., a virtual port bound to an existing buffer) in one of the three modes, namely an "in" mode, an "out" mode, or a "bidirectional" ("bid.") mode. The "in" mode configures a virtual port to receive packets over the switching fabric, and to pass the received packets to a buffer the virtual port is bound to. Packets received over the switching fabric may have been forwarded from a physical port of the network device or from a buffer the virtual port is not bound to. The "out" mode configures a virtual port to receive packets from a buffers the virtual port is bound to, and pass the packets to the switching fabric. Packets passed to the switching fabric may be forwarded to a physical port of the network device or to a buffer the virtual port is not bound to. The "bid." mode configures a virtual port to support both the "in" and "out" modes simultaneously. Once a virtual port is bound to a buffer, it can be tied to the processing pipeline by flow table rules.

The network controller 295 may also send a flow modification add (flow_mod(add)) instruction 940 to the CDPI agent 220. The flow_mod(add) instruction 940 may instruct the CDPI agent 220 to install one or more flow instructions in a switching fabric associated with one or more virtual port(s) bound to a programmable buffer. In one example, the flow_mod(add) instruction 940 instructs the CDPI agent 220 to add new flow table entries to a switching fabric. The new flow table entries may define a packet match pattern, as well as specify a virtual port in which to forward matching packets. Once a flow control rule is pushed to the flow tables, any matching flow will go into the specified virtual port, and, if the virtual port is configured to operate in the "in" or "bid." modes, the packet will be passed to the corresponding buffer in which the virtual port is attached to.

To serve packets stored in a programmable buffer, one or more virtual ports may be attached to that buffer using "out" or "bid." modes. Upon receiving the flow_mod(add) instruction 940, the CDPI agent 220 may install the flow instruction(s) in the switching fabric, and return a flow_mod(add) response 945 to the network controller 295 confirming that the flow instruction(s) have been deleted.

The network controller 295 may also send a flow modification delete (flow_mod(delete)) instruction 950 to the CDPI agent 220 that instructs the CDPI agent 220 to delete one or more flow instructions associated with a virtual port from a switching fabric. The CDPI agent 220 may delete the flow instructions, and return a flow_mod(delete) response 955 to the network controller 295 confirming that the flow instruction(s) have been deleted.

The network controller 295 may send an unbind virtual port (unbind_vport) instruction 960 to the CDPI agent 220. The unbind_vport instruction 960 may instruct the CDPI agent 220 to detach a virtual port from a programmable buffer, and upon doing so, the CDPI agent 220 may return an unbind_vport response 965 to the network controller 295 indicating that the virtual port has been detached from the programmable buffer.

The network controller 295 may send a delete buffer (delete_buffer) instruction 970 to the CDPI agent 220 to instruct the CDPI agent 220 to delete a programmable buffer. Upon receiving the delete_buffer instruction 970, the CDPI agent 220 may delete the programmable buffer by, for example, reclaiming memory allocated to the programmable buffer, and return a delete_buffer response 975 to the network controller 295 that the programmable buffer has been deleted.

The network controller 295 may also send a delete virtual port (delete_vport) instruction 980 to the CDPI agent 220 that instructs the CDPI agent 220 to delete a virtual port. The CDPI agent 220 may then delete the virtual port, and return a delete_vport response 985 to the network controller 295 confirming that the virtual port has been deleted.

Although the messages 910-985 are shown as be passed directly between the network controller 295 and the CDPI agent 220, it should be appreciated that the messages may be relayed through an intermediate entity, e g. a proxy, etc. It should also be appreciated that the messages 910-985 may be communicated between the network controller 295 and the CDPI agent 220 in a different order. For example, the create_vport instruction 910 could be communicated after the create_buffer instruction 920.

Figure 10:
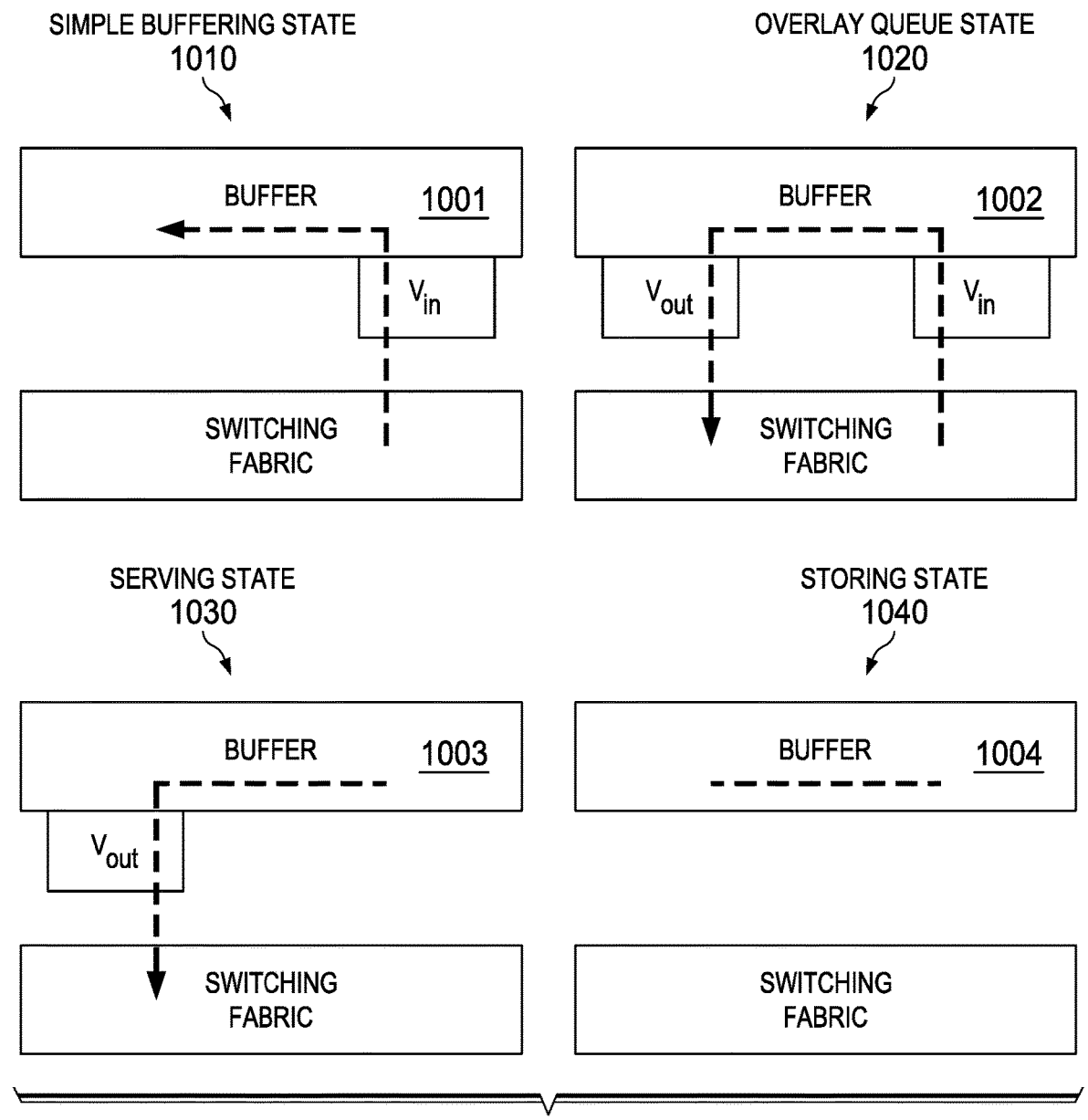
FIG. 10 is a diagram of an embodiment buffer state configurations.

FIG. 10 is a diagram of an embodiment buffer state configurations. As shown, the buffer 1001 is in a simple buffering state 1010. As a result, the buffer 1001 can receive new packets over an RX virtual port, but cannot send packets over a TX virtual port. The buffer 1002 is in an overlay queue state 1020, and consequently, can both receive new packets over an RX virtual port and send buffered packets over a TX virtual port. The buffer 1003 is in a serving state 1030, and as a result, can send buffered packets over a TX virtual port, but cannot receive new packets over an RX virtual port. The buffer 1004 is in a storing state 1040, and is required to store existing packets, but cannot receive new packets over an RX virtual port or send packets over a TX virtual port.

Figure 11:
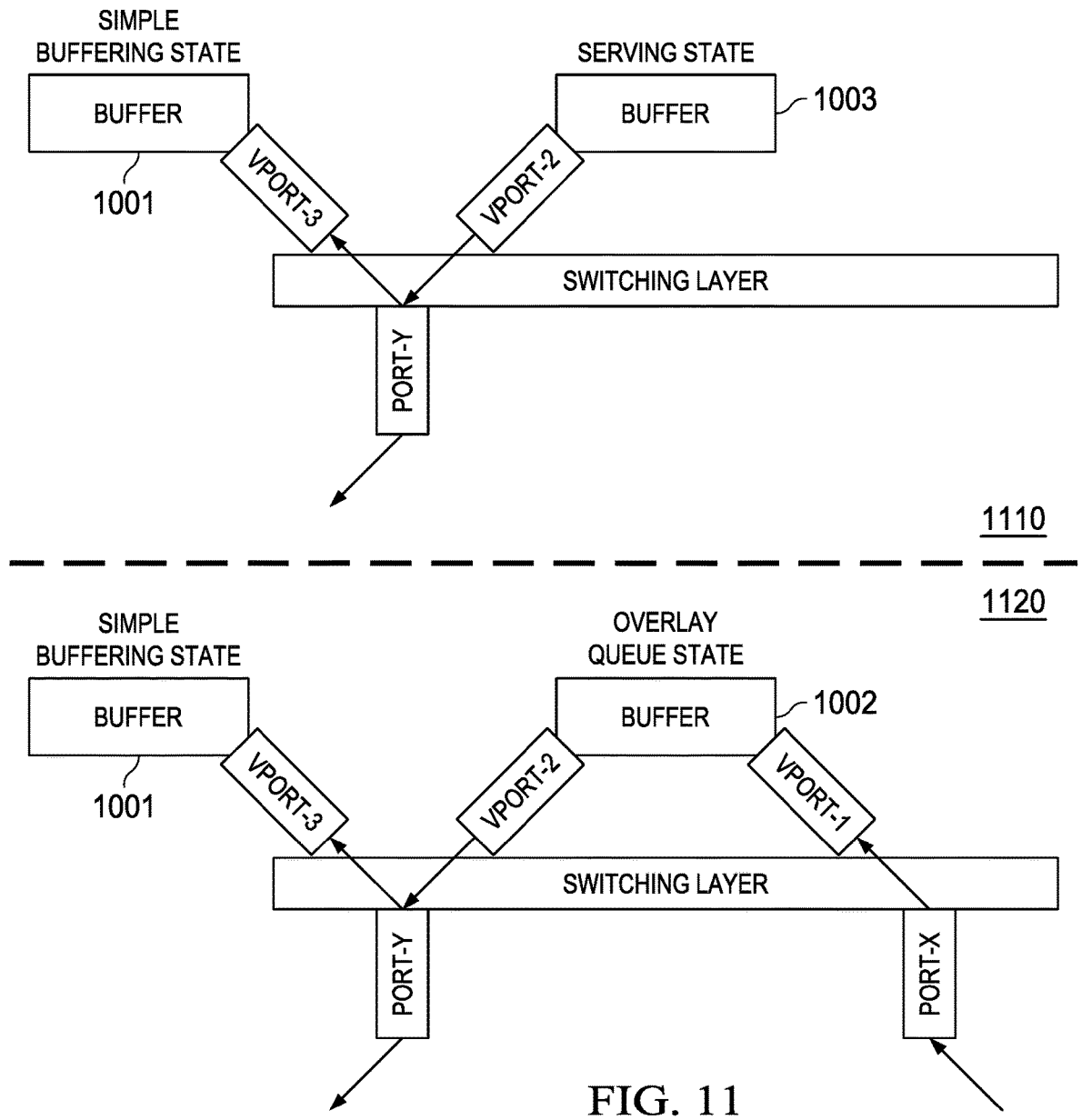
FIG. 11 is a diagram of relationships between programmable buffers in different buffer state configurations.

FIG. 11 depicts diagrams of interactions 1110, 1120 between programmable buffers in different buffer state configurations. As shown by the interaction 1110, the buffer 1003 in the serving state can send a packet over a physical port (port y) and/or to the buffer 1001 in the simple buffering state. Likewise, as shown by the interaction 1120, the buffer 1002 in the overlay queue state can receive a packet over a physical port (port-x), and send the packet over a physical port (port y) and/or to the buffer 1001 in the simple buffering state.

Figure 12:
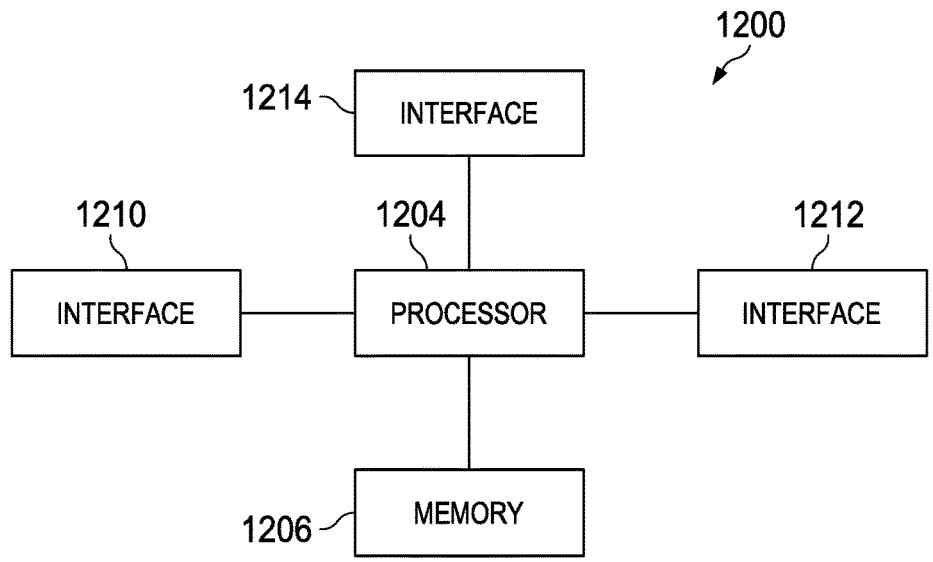
FIG. 12 illustrates a block diagram of a processing system.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
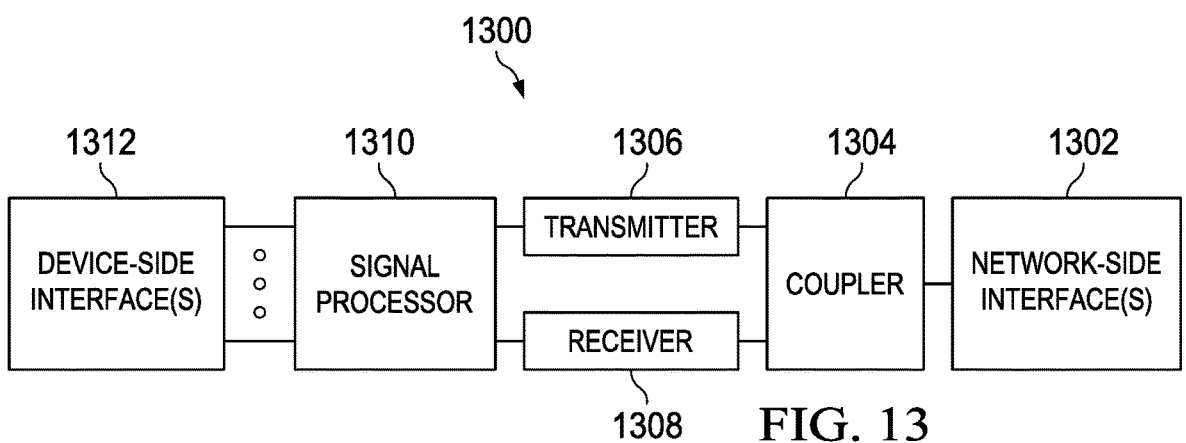
FIG. 13 illustrates a block diagram of a transceiver.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 14:
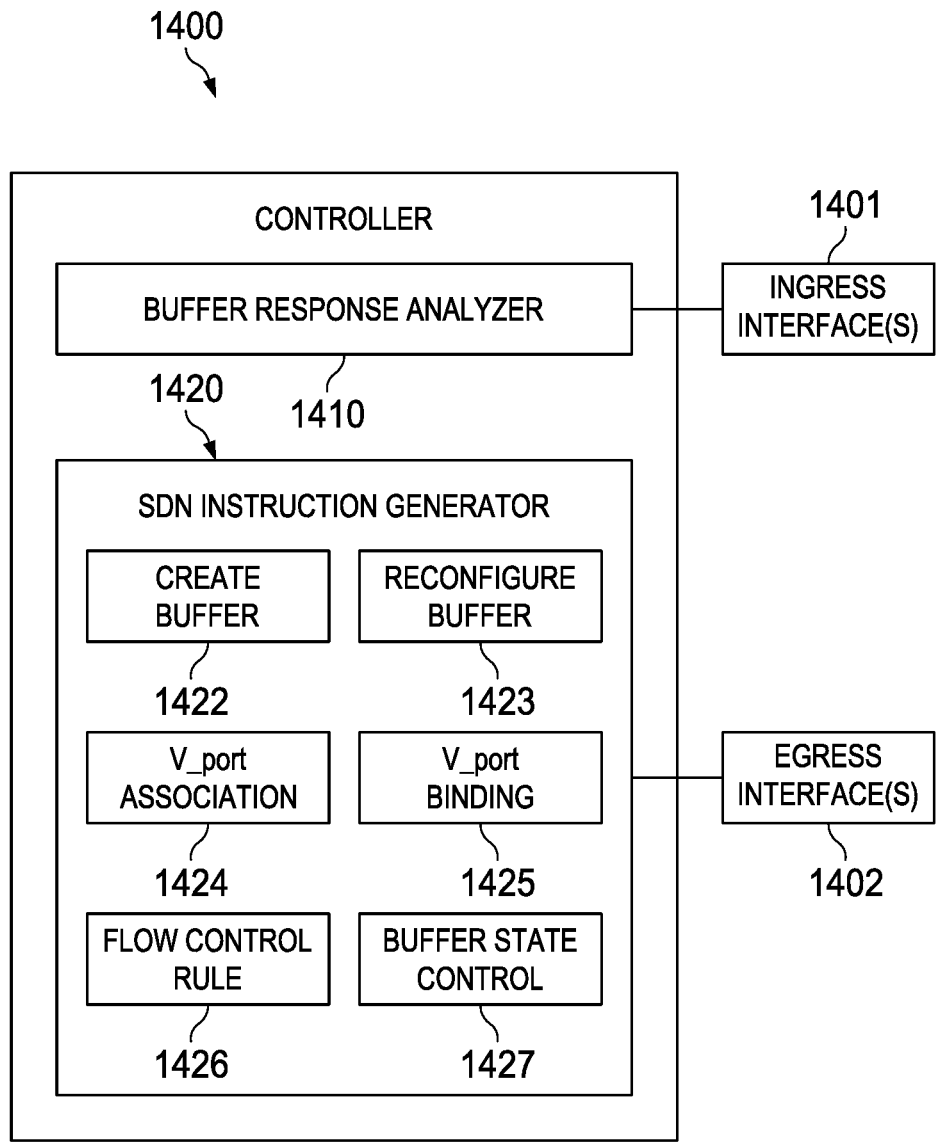
FIG. 14 illustrates a diagram of an embodiment controller adapted to generate SDN instructions for dynamically configurating programmable buffers in network devices on a data plane of a network.

FIG. 14 illustrates a block diagram of an embodiment controller 1400 adapted to dynamically configure programmable buffers in network devices on a data plane. As shown, the embodiment controller 1400 includes one or more ingress interface means 1401, one or more egress interface means 1402, a buffer response message analyzer means 1410, and a SDN instruction generator means 1420. The one or more ingress interface means 1401 may be configured to receive buffer responses, as well as other information, from network devices on a data plane of a network. The buffer response message analyzer means 1410 may be configured to analyze buffer response messages received over the one or more ingress interface means 1401, and determine whether a corresponding buffer instruction (e.g., create buffer, associated v_port with buffer, etc.) was successfully performed by a corresponding network device. The SDN instruction message generator means 1420 may be configured to generate SDN instructions for instructing CDPI agents to configure buffers in the network device to store data packets for a specific type of traffic flow in accordance with a traffic handling policy. The one or more egress interface means 1402 may be configured to transmit the buffer instructions generated by the buffer instruction message generator means 1420 to network devices on a data plane of a network.

In this example, the SDN instruction message generator means 1420 includes a create buffer means 1422, a reconfigure buffer means 1423, a v_port association means 1424, a v_port binding means 1425, a flow control rule means 1426, a buffer state control means 1427. The create buffer means 1422 may generate SDN instructions that instruct CDPI Agents to establish a new buffer in network devices. The reconfigure buffer means 1423 may generate SDN instructions that instruct CDPI Agents to reconfigure existing buffers in network devices. The v_port association unit 1424 may generate SDN instructions that instruct CDPI Agents to associate virtual ports with new/existing buffers in network devices. The v_port binding means 1425 may generate SDN instructions that instruct CDPI Agents to bind virtual ports that are associated with buffers to switches or switching fabrics in network devices. The flow control rule means 1426 may generate SDN instructions that instruct CDPI Agents to install flow control rules in switches or switching fabrics in network devices. The buffer state control means 1427 may generate SDN instructions that instruct CDPI Agents to transition a buffer to a different state (e.g., null, initialized, etc.).

In one embodiment, means 1410-1426 of the embodiment controller 1400 may include integrated circuit means that execute computer instructions stored in memory, field programmable gate arrays (FPGAs) means that comprise configurable hardware logic or application-specific integrated circuit means (ASICs) with hardware logic designed to perform specific functions or tasks.

What is claimed is:

1. A method for dynamically configuring buffers of a network device on a data plane of a telecommunications network, the method comprising:

sending, by a controller, a software defined network (SDN) instruction to the network device on the data plane of the telecommunications network, the SDN instruction instructing a Control-to-Data-Plane Interface (CDPI) Agent to re-configure a buffer, previously configured in the network device, according to a traffic handling policy by transitioning the buffer to a different state such that, after the transition, the different state governs how data packets of a specific traffic flow type are stored in the buffer and/or forwarded out of the buffer over one or more virtual ports.

2. The method of claim 1, wherein the network device is one of a network gateway, a network switch, a network router, a base station, or a relay station, and wherein the SDN instruction is a device-specific instruction corresponding to a network device type associated with the network device.

3. The method of claim 1, wherein the controller is one of a mobility management entity (MME), a Slice Management Entity, a Connectionless Service Management Entity, a content distribution network (CDN) management entity, a cache Management entity, or a radio resource control (RRC) signaling controller.

4. The method of claim 1, further comprising sending, by the controller, a subsequent SDN instruction that instructs the CDPI Agent to terminate the buffer in the network device.

5. The method of claim 1, wherein the SDN instruction further instructs the CDPI Agent to associate a virtual port with the buffer.

6. The method of claim 1, wherein the SDN instruction further instructs the CDPI Agent to bind a virtual port associated with the buffer to a switch.

7. The method of claim 1, wherein the SDN instruction further instructs the CDPI Agent to install a flow control rule in a flow table of a switch bound to a virtual port associated with the buffer, the switch being configured to switch packets between the virtual port associated with the buffer and a physical port of the network device according to the flow control rule after the flow control rule is installed in the flow table.

8. The method of claim 1, wherein the different state is a null state, and wherein transitioning the buffer to the null state detaches one or more virtual ports that were previously bound to the buffer and reclaims memory that was previously allocated to the buffer.

9. The method of claim 1, wherein the different state is an initialized state, and wherein transitioning the buffer to the initialized state allocates memory to the buffer and configures the buffer to store and forward the data packets.

10. The method of claim 1, wherein the different state is a storing state, and wherein transitioning the buffer to the storing state prevents the buffer both from storing new data packets and from sending existing data packets over virtual ports bound to the buffer.

11. The method of claim 1, wherein the different state is a simple buffering state, and wherein transitioning the buffer to the simple buffering state prevents the buffer from sending existing data packets over any virtual ports while also permitting the buffer to store new data packets.

12. The method of claim 1, wherein the different state is a serving state, and wherein transitioning the buffer to the serving state prevents the buffer from storing new data packets while also permitting the buffer to send existing data packets over one or more virtual ports bound to the buffer.

13. The method of claim 1, wherein the different state is an overlay queue state, and wherein transitioning the buffer to the overlay queue state permits the buffer to both store new data packets and send existing data packets over the one or more virtual ports.

14. A controller comprising:
a processor; and
a non-transitory computer readable storage medium storing programming for execution by the processor, the programming including instructions to:
send a software defined network (SDN) instruction to a network device on a data plane of a mobile telecommunications network, the SDN instruction instructing a Control-to-Data-Plane Interface (CDPI) Agent to re-configure a buffer, previously configured in the network device, according to a traffic handling policy by transitioning the buffer from a first state to a different state such that, after the transition, the different state governs how data packets of a specific traffic flow type are stored in the buffer and/or forwarded out of the buffer over one or more virtual ports.

15. A method for dynamically configuring buffers of a network device on a data plane of a telecommunications network, the method comprising:
receiving, by a Control-to-Data-Plane Interface (CDPI) Agent in a network device, a software defined network (SDN) instruction from a controller; and
re-configuring, by the CDPI Agent based on the SDN instruction, a buffer in the network device according to a traffic handling policy by transitioning the buffer from a first state to a different state such that, after the transition, the different state governs how data packets of a specific traffic flow type are stored in the buffer and/or forwarded out of the buffer over one or more virtual ports.

16. The method of claim 15, further comprising:
installing, by the CDPI Agent, a flow control rule in a flow table of a switch bound to a virtual port associated with the buffer based on the SDN instruction, installation of the flow control rule configuring the switch to switch packets between the virtual port associated with the buffer and a physical port of the network device according to the flow control rule.

17. A network device on a data plane of a telecommunications network, the network device comprising:
a processor; and
a non-transitory computer readable storage medium storing programming for execution by the processor, the programming including instructions to:
receive, by a Control-to-Data-Plane Interface (CDPI) Agent in the network device, a software defined network (SDN) instruction from a controller; and
re-configure, by the CDPI Agent based on the SDN instruction, a buffer, previously configured in the network device, according to a traffic handling policy by transitioning the buffer from a first state to a different state such that, after the transition, the different state governs how data packets of a specific traffic flow type are stored in the buffer and/or forwarded out of the buffer over one or more virtual ports.

18. The network device of claim 17, wherein the programming further includes instructions to install, by the CDPI Agent, a flow control rule in a flow table of a switch bound to a virtual port associated with the buffer based on the SDN instruction, installation of the flow control rule configuring the switch to switch packets between the virtual port associated with the buffer and a physical port of the network device according to the flow control rule.

19. The network device of claim 17, wherein the different state is a null state, and wherein transitioning the buffer to the null state detaches one or more virtual ports that were previously bound to the buffer and reclaims memory that was previously allocated to the buffer.

20. The network device of claim 17, wherein the different state is an initialized state, and wherein transitioning the buffer to the initialized state allocates memory to the buffer and configures the buffer to store and forward the data packets.

21. The network device of claim 17, wherein the different state is a storing state, and wherein transitioning the buffer to the storing state prevents the buffer both from storing new data packets and from sending existing data packets over virtual ports bound to the buffer.

22. The network device of claim 17, wherein the different state is a simple buffering state, and wherein transitioning the buffer to the simple buffering state prevents the buffer from sending existing data packets over any virtual ports while also permitting the buffer to store new data packets.

23. The network device of claim 17, wherein the different state is a serving state, and wherein transitioning the buffer to the serving state prevents the buffer from storing new data packets while also permitting the buffer to send existing data packets over one or more virtual ports bound to the buffer.

24. The network device of claim 17, wherein the different state is an overlay queue state, and wherein transitioning the buffer to the overlay queue state permits the buffer to both store new data packets and send existing data packets over the one or more virtual ports.

25. The controller of claim 14, wherein the different state is a null state, and wherein transitioning the buffer to the null state detaches one or more virtual ports that were previously bound to the buffer and reclaims memory that was previously allocated to the buffer.

26. The controller of claim 14, wherein the different state is an initialized state, and wherein transitioning the buffer to the initialized state allocates memory to the buffer and configures the buffer to store and forward the data packets.

27. The controller of claim 14, wherein the different state is a storing state, and wherein transitioning the buffer to the storing state prevents the buffer both from storing new data packets and from sending existing data packets over virtual ports bound to the buffer.

28. The controller of claim 14, wherein the different state is a simple buffering state, and wherein transitioning the buffer to the simple buffering state prevents the buffer from sending existing data packets over any virtual ports while also permitting the buffer to store new data packets.

29. The controller of claim 14, wherein the different state is a serving state, and wherein transitioning the buffer to the serving state prevents the buffer from storing new data packets while also permitting the buffer to send existing data packets over one or more virtual ports bound to the buffer.

30. The controller of claim 14, wherein the different state is an overlay queue state, and wherein transitioning the buffer to the overlay queue state permits the buffer to both store new data packets and send existing data packets over the one or more virtual ports.

31. The method of claim 15, wherein the different state is a null state, and wherein transitioning the buffer to the null state detaches one or more virtual ports that were previously bound to the buffer and reclaims memory that was previously allocated to the buffer.

32. The method of claim 15, wherein the different state is an initialized state, and wherein transitioning the buffer to the initialized state allocates memory to the buffer and configures the buffer to store and forward the data packets.

33. The method of claim 15, wherein the different state is a storing state, and wherein transitioning the buffer to the storing state prevents the buffer both from storing new data packets and from sending existing data packets over virtual ports bound to the buffer.

34. The method of claim 15, wherein the different state is a simple buffering state, and wherein transitioning the buffer to the simple buffering state prevents the buffer from sending existing data packets over any virtual ports while also permitting the buffer to store new data packets.

35. The method of claim 15, wherein the different state is a serving state, and wherein transitioning the buffer to the serving state prevents the buffer from storing new data packets while also permitting the buffer to send existing data packets over one or more virtual ports bound to the buffer.

36. The method of claim 15, wherein the different state is an overlay queue state, and wherein transitioning the buffer to the overlay queue state permits the buffer to both store new data packets and send existing data packets over the one or more virtual ports.

\* \* \* \* \*